(12) United States Patent
Song et al.

(10) Patent No.: US 12,030,282 B2
(45) Date of Patent: Jul. 9, 2024

(54) CO-EXTRUSION SPC FOAM FLOORING AND MANUFACTURING METHOD THEREOF

(71) Applicant: FLOORING INDUSTRIES LIMITED, SARL, Bertrange (LU)

(72) Inventors: Jiangang Song, Zhejiang (CN); Jiajin Fu, Zhejiang (CN); Fuqing Liu, Zhejiang (CN)

(73) Assignee: UNILIN, BV, Wielsbeke (BE)

( * ) Notice: Subject to any disclaimer, the term of this patent is extended or adjusted under 35 U.S.C. 154(b) by 150 days.

(21) Appl. No.: 17/783,880

(22) PCT Filed: Sep. 25, 2019

(86) PCT No.: PCT/CN2019/107717
§ 371 (c)(1),
(2) Date: Jun. 9, 2022

(87) PCT Pub. No.: WO2021/031289
PCT Pub. Date: Feb. 25, 2021

(65) Prior Publication Data
US 2023/0064465 A1    Mar. 2, 2023

(30) Foreign Application Priority Data
Aug. 16, 2019   (CN) .......................... 201910757502.1

(51) Int. Cl.
*B32B 27/06* (2006.01)
*B32B 5/18* (2006.01)
(Continued)

(52) U.S. Cl.
CPC .............. *B32B 27/065* (2013.01); *B32B 5/18* (2013.01); *B32B 27/08* (2013.01); *B32B 27/20* (2013.01);
(Continued)

(58) Field of Classification Search
CPC ............ B32B 2255/10; B32B 2255/26; B32B 2262/101; B32B 2262/106;
(Continued)

(56) References Cited

U.S. PATENT DOCUMENTS 9,527,975 B2    12/2016 Fang
2006/0032175 A1    2/2006 Chen et al.
(Continued)

FOREIGN PATENT DOCUMENTS

CN    204212343 U    3/2015
CN    105908946 A    8/2016
(Continued)

OTHER PUBLICATIONS

Translation of CN 109720058 A, Zhu Chen, May 7, 2019. (Year: 2019).*
Translation of CN 206374292 U, Y Hu, Aug. 4, 2017. (Year: 2017).*
International Search Report from corresponding PCT Application No. PCT/CN2019/107717, May 15, 2020.
(Continued)

*Primary Examiner* — Hai Vo
(74) *Attorney, Agent, or Firm* — Workman Nydegger

(57) ABSTRACT

A foam flooring includes a stone-plastic base material structure, which sequentially comprises, from top to bottom, a first stable layer, a foaming layer and a second stable layer. The first stable layer and the second stable layer are both sheets with a PVC resin and filler powder as main components, with 25-40 parts by mass of the PVC resin and 55-75 parts by mass of the filler powder; and the density of the SPC foam flooring is 1.4-1.6 g/cm3. The foaming layer is arranged between the two stable layers, such that the overall density of the flooring is significantly reduced and reaches 1.4-1.6 g/m3; since the foaming layer is arranged inside, the surface strength of the overall flooring is not influenced.

7 Claims, 3 Drawing Sheets

(51) Int. Cl.
  *B32B 27/08* (2006.01)
  *B32B 27/20* (2006.01)
  *B32B 27/30* (2006.01)
(52) U.S. Cl.
  CPC ........ *B32B 27/304* (2013.01); *B32B 2255/10* (2013.01); *B32B 2262/101* (2013.01); *B32B 2262/106* (2013.01); *B32B 2264/104* (2013.01); *B32B 2266/0214* (2013.01); *B32B 2266/04* (2013.01); *B32B 2307/554* (2013.01); *B32B 2307/72* (2013.01); *B32B 2307/732* (2013.01); *B32B 2419/04* (2013.01)
(58) Field of Classification Search
  CPC ...... B32B 2264/104; B32B 2266/0214; B32B 2266/0235; B32B 2266/04; B32B 2307/4026; B32B 2307/554; B32B 2307/72; B32B 2307/732; B32B 2419/04; B32B 2471/00; B32B 27/065; B32B 27/08; B32B 27/20; B32B 27/304; B32B 5/18; C08J 2201/03; C08J 2203/06; C08J 2327/06; C08J 2423/28; C08J 2427/24; C08J 9/0061; C08J 9/0066; C08J 9/122; C08K 2003/265; C08K 3/26; C08K 5/098; C08L 2205/035; C08L 23/286; C08L 27/06; C08L 33/06; C08L 91/08; E04F 15/102; E04F 15/107
  See application file for complete search history.

(56) References Cited

U.S. PATENT DOCUMENTS

| | | |
|---|---|---|
| 2011/0167744 A1 | 7/2011 | Whispell et al. |
| 2015/0267025 A1* | 9/2015 | Fang .......................... C08J 9/08 428/318.6 |
| 2018/0142478 A1* | 5/2018 | Xu ........................ E04F 15/107 |
| 2019/0001543 A1* | 1/2019 | Dai ....................... E04F 15/107 |
| 2019/0211571 A1 | 7/2019 | Van Vlassenrode et al. |
| 2020/0048915 A1 | 2/2020 | Van Vlassenrode et al. |

FOREIGN PATENT DOCUMENTS

| | | | | |
|---|---|---|---|---|
| CN | 205663161 U | | 10/2016 | |
| CN | 206374292 U | * | 8/2017 | ............ B32B 27/06 |
| CN | 107118472 A | | 9/2017 | |
| CN | 107718498 A | | 2/2018 | |
| CN | 107936415 A | | 4/2018 | |
| CN | 109720058 A | * | 5/2019 | ............ B32B 27/06 |
| EP | 1247641 A1 | | 10/2002 | |
| EP | 2735645 A1 | | 5/2014 | |
| JP | 2000213152 A | | 8/2000 | |
| KR | 20170130791 A | | 11/2017 | |
| RU | 2648083 C2 | | 3/2018 | |

OTHER PUBLICATIONS

International Preliminary Report on Patentability from corresponding PCT Application No. PCT/CN2019/107717, Feb. 17, 2022.

* cited by examiner

CO-EXTRUSION SPC FOAM FLOORING AND MANUFACTURING METHOD THEREOF

TECHNICAL FIELD

The present invention relates to a foam flooring, in particular an SPC foam flooring, and a manufacturing method thereof.

BACKGROUND ART

With the continuous development of the PVC flooring industry, plastic flooring has gradually become an alternative material to traditional flooring materials, such as wooden flooring, ceramic tile and reinforced flooring. Industrial experts predict that plastic flooring will be accepted by Chinese people as a commonly used decorative material for home decoration in the next few years. With the rapid development of the real estate industry, the load-bearing performance of the flooring materials has become a new requirement for high-rise home decoration and commercial decoration, and stricter requirements have been imposed on PVC flooring products.

BRIEF DESCRIPTION OF INVENTION

Technical Problem

Traditional SPC flooring has a density in the range of 1900 to 2000 kg/m$^3$. The high density of the SPC flooring leads to increased weight per unit area during the decoration and increased transportation costs.

Solution for the Problem

Technical Solution

The present invention provides a SPC foam flooring to solve the aforesaid problem. This type of flooring is around 20 to 30% lighter than traditional SPC flooring. It also exhibits improved dimensional stability.

The technical solution of the present invention used to solve the aforesaid problem is as follows:

A co-extrusion SPC foam flooring, comprising a stone-plastic base material structure, wherein the stone-plastic base material structure sequentially comprises, from top to bottom, a first stable layer, a foaming layer and a second stable layer; the first stable layer and the second stable layer are both sheets with a PVC resin and filler powder as main components; wherein the amount of the PVC resin is 100 parts by weight and the amount of the filler powder is 200 to 300 parts by weight; the density of the SPC foam flooring is in the range of 1.4 to 1.6 g/cm$^3$.

As a preferred embodiment of the aforesaid technical solution, the first stable layer has a thickness in the range of 1 to 5 mm; the foaming layer has a thickness in the range of 2 to 10 mm; the second stable layer has a thickness in the range of 1 to 5 mm.

As a preferred embodiment of the aforesaid technical solution, the filler powder is calcium carbonate or comprises calcium carbonate as a main component and one material selected from the group consisting of calcium bicarbonate, glass fiber and carbon fiber or any mixture thereof.

As a preferred embodiment of the aforesaid technical solution, the first stable layer and the second stable layer further comprise an additive, and the additive is one additive selected from the group consisting of a calcium zinc stabilizer, an internal lubricant, polyethylene wax, chlorinated polyethylene, acrylate, a composite lubricant and a colorant or any combination thereof.

As a further preferred embodiment of the aforesaid technical solution, when the foaming layer is a chemical foaming layer, the first stable layer and the second stable layer further comprise the following components in parts by weight: 100 parts of polyvinyl chloride resin powder, 200 to 300 parts of calcium carbonate, 4 to 7 parts of a calcium zinc stabilizer, 0.8 to 1.3 parts of an internal lubricant, 0.8 to 1.5 parts of polyethylene wax, 4 to 6 parts of chlorinated polyethylene, 2 to 5 parts of acrylate, 1.0 to 1.5 parts of a composite lubricant, and 0.4 to 0.6 parts of a colorant.

As another further preferred embodiment of the aforesaid technical solution, when the foaming layer is a physical foaming layer, the first stable layer and the second stable layer further comprise the following components in parts by weight: 100 parts of polyvinyl chloride resin powder, 250 to 270 parts of calcium carbonate, 5 to 6 parts of a calcium zinc stabilizer, 1.0 to 1.2 parts of an internal lubricant, 1.3 to 1.5 parts of polyethylene wax, 5 to 6 parts of chlorinated polyethylene, 2 to 3 parts of acrylate, 1.1 to 1.3 parts of a composite lubricant, and 0.4 to 0.5 parts of a colorant.

Lubricants are divided into two types, internal lubricant and external lubricant. The main function of the external lubricant is to improve the friction between the polymer fusant and the hot metal surface of the processing device. It is poorly compatible with the polymer and easily migrates outwards from the fusant, so it can form a thin lubrication layer at the interface between the plastic fusant and the metal. Internal lubricants are highly compatible with polymers and are present inside the polymers to reduce the cohesive force within the polymer molecules so as to improve the frictional heat generation and flowability of the plastic fusant. External lubricants readily migrate outwards from the fusant making it easy for the plastic fusant to release from the mold after molding, so external lubricants are usually referred to as mold release agent. However, internal lubricants and external lubricants may change depending on the properties of the fusant. For example, polyethylene wax and stearic acid are common lubricants; when being used in polyethylene resin, polyethylene wax is highly compatible with polyethylene resin and is retained inside the resin as an internal lubricant; when being used in polyvinyl chloride resin, stearic acid is highly compatible and is retained inside the resin as an internal lubricant, but polyethylene wax is poorly compatible and migrates outside the resin as an external lubricant.

Composite lubricants generally refer to polyol esters. Such lubricants include lubricants comprising polyol esters obtained by esterificaiton, alcoholysis and interesterification of fatty acids, such as caprylic acid, decanoic acid, lauric acid, palmitic acid, oleic acid, stearic acid, arachidic acid, adipic acid, and sebacic acid, or polymer composite alcohol ester products formed by multiple esterifications and compounding of such fatty acids. In such lubricants, the polyol in the polyol ester products is partially esterified, so there are unreacted hydroxyl groups in the ester. The polar hydroxyl groups usually impart excellent antistatic effect to the products. Therefore, such lubricants also serve as an anti-static agent in PVC processing. Pentaerythritol fatty acid ester is a mixture containing monoester, diester, triester and tetra-ester, and exhibits an excellent internal lubrication effect in PVC processing. Due to the difference in the extent of reaction, this type of product is changed from internal lubricant to external lubricant with increasing number of hydroxyl groups.

As a preferred embodiment of the aforesaid technical solution, the foaming layer is a chemical foaming layer comprising the following components in parts by weight: 100 parts of polyvinyl chloride resin powder, 150 to 200 parts of calcium carbonate, 4 to 7 parts of a calcium zinc stabilizer, 0.6 to 1.2 parts of a foaming agent, 0.5 to 0.9 parts of polyethylene wax, 2 to 3 parts of chlorinated polyvinyl chloride, 2 to 3 parts of acrylate, 0.3 to 0.8 parts of a lubricant, and 6 to 9 parts of a foaming regulator.

As a further preferred embodiment of the aforesaid technical solution, the foaming agent comprises 0.4 to 0.6 parts of a colorant.

As another preferred embodiment of the aforesaid technical solution, the foaming layer is a physical foaming layer comprising the following components in parts by weight: 100 parts of polyvinyl chloride resin powder, 300 to 330 parts of calcium carbonate, 4 to 7 parts of a calcium zinc stabilizer, 1 to 1.5 parts of an internal lubricant, 1 to 1.5 parts of polyethylene wax, 4 to 8 parts of chlorinated polyethylene, 3 to 5 parts of acrylate, and 0.7 to 1.2 parts of a composite lubricant.

As a further preferred embodiment of the aforesaid technical solution, the foaming agent comprises 0.4 to 0.6 parts of a colorant.

As a preferred embodiment of the aforesaid technical solution, the SPC foam flooring further comprises a decorative and protective structure sequentially comprising, from top to bottom, a UV coating, a wear-resistant layer and a decorative layer.

As a preferred embodiment of the aforesaid technical solution, the UV coating has a thickness in the range of 30 to 150 μm; the wear-resistant layer is a polymer layer with a thickness in the range of 0.1 to 1.0 mm.

As a preferred embodiment of the aforesaid technical solution, the wear-resistant layer comprises PVC resin or vinyl resin as a main component, and is formed by the blow molding, extrusion or drawing process after the addition of suitable amounts of plasticizer, lubricant and stabilizer.

As a preferred embodiment of the aforesaid technical solution, the decorative layer is a PVC film with surface pattern.

Another objective of the present invention is to provide a method for preparing the SPC foam flooring.

The method comprises the following steps:
a. Feeding the raw materials for the first stable layer and the second stable layer into the high-speed mixer, mixing and heating the raw materials, cooling the mixture under low-speed stirring, extruding the mixture from the extruder A;
b. Feeding the raw materials for the foaming layer into the high-speed mixer, mixing and heating the raw materials, cooling the raw materials under low-speed stirring, introducing the raw materials into the extruder B; in case of chemical foaming, performing even melt plastification and extruding the raw materials from the extruder B; in case of physical foaming, performing even melt plastification for the raw materials in the extruder B, injecting 4-10 wt % liquefied high-pressure carbon dioxide into the foaming agent injection device, maintaining a high pressure in the mold cavity to keep carbon dioxide in a liquid state so as to completely mix with the material, releasing the pressure during the course of extrusion;
c. Allowing the extrudate of the extruder A to enter the mold flow channel distributor and converge with the extrudate of the extruder B at the die head, co-extruding the mixture through the die orifice of the die head to form the stone-plastic base material structure;
d. Passing the plate released from the mold through an area between the background pattern roller and the first mirror finish roller to form the background pattern by compression, transferring the stone-plastic base material structure to an area between the second mirror finish roller and the embossing roller; allowing the servo feeding roller for the wear-resistant layer and the servo feeding roller for the decorative layer to transfer the wear-resistant layer and the decorative paper respectively to an area between the second mirror finish roller and the air release roller, performing pre-lamination; laminating the wear-resistant layer and the decorative paper on the base material layer through the action of the second mirror finish roller and the embossing roller to form the wear-resistant layer and the decorative layer, as well as a surface pattern with concave and convex three-dimensional effect on the front face.

BENEFICIAL EFFECTS OF THE INVENTION

Beneficial Effects

In summary, the present invention delivers the following beneficial effects:

In the present invention, the foaming layer is disposed between two stable layers to significantly reduce the overall density of the flooring to 1.4 to 1.6 g/m³. Since the foaming layer is arranged inside, the surface strength of the flooring is not influenced and the sound-absorbing performance of the flooring is enhanced, and tests prove that the dimensional stability of the present invention is significantly improved.

BRIEF DESCRIPTION OF DRAWINGS

Description of Drawings

Figure 1:
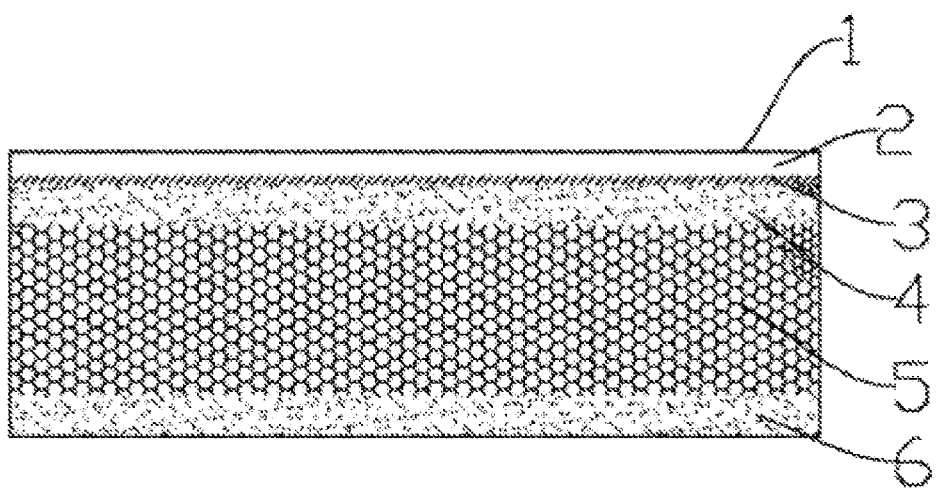
Figure 2:
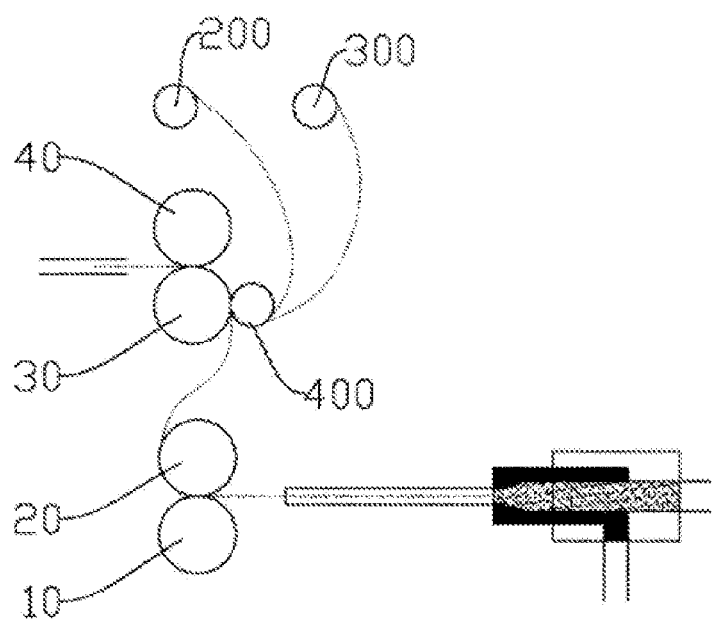
Figure 3:
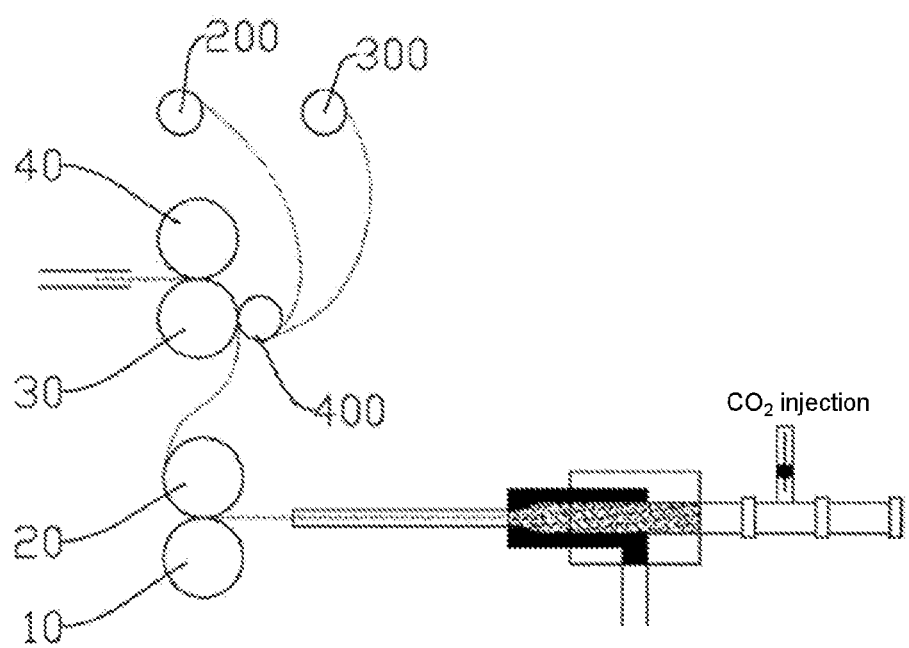

FIG. 1 shows a schematic diagram indicating the structure of the present invention;
FIG. 2 is a schematic diagram indicating the device of the present invention;
FIG. 3 is a schematic diagram indicating the device according to Example 1 of the present invention; wherein, 1—UV coating, 2—wear-resistant layer, 3—decorative layer, 4—first stable layer, 5—foaming layer, 6—second stable layer, 10—background pattern roller, 20—first mirror finish roller; 30—second mirror finish roller, 40—embossing roller, 200—the servo feeding roller for the wear-resistant layer, 300—the servo feeding roller for the decorative layer, 400—air release roller.

MOST PREFERRED EMBODIMENT FOR CARRYING OUT THE INVENTION

Best Mode for Carrying Out the Invention

As shown in FIG. 1, a co-extrusion SPC foam flooring comprises a decorative and protective structure and a stone-plastic base material structure.

The decorative and protective structure sequentially comprises, from top to bottom, a UV coating (1), a wear-resistant layer (2) and a decorative layer (3); the stone-plastic base material structure sequentially comprises, from top to bottom, a first stable layer (4), a foaming layer (5), and a second stable layer (6). The density of the SPC foam flooring is 1.531 g/cm³.

In this Example, the thickness of the UV coating (1) is 100 μm.

The wear-resistant layer (2) comprises a PVC resin as a main component and is obtained by the calendering process after the addition of suitable amounts of plasticizer, lubricant and stabilizer. Its thickness is 0.3 mm.

The decorative layer (3) is a PVC film with surface pattern. Its thickness is 0.07 mm.

The first stable layer (4) and the second stable layer (6) are both sheets with a PVC resin and filler powder as main components; wherein the amount of the PVC resin is 100 parts by weight, the filler powder is calcium carbonate with an amount of 250 parts by weight, and additives comprising the following components in parts by weight are added:
  5 parts of a calcium zinc stabilizer
  part of an internal lubricant
  1.4 parts of polyethylene wax
  5 parts of chlorinated polyethylene
  2 parts of acrylate
  parts of a composite lubricant
  0.5 parts of a colorant The aforesaid auxiliary agents are conventional auxiliary agents in the art, so there is no need to go into details.

The foaming layer (5) is a chemical foaming layer comprising the following components in parts by weight:
  100 parts of PVC resin powder
  160 parts of calcium carbonate
  6 parts of a calcium zinc stabilizer
  0.8 parts of a foaming agent
  0.6 parts of polyethylene wax
  2 parts of chlorinated polyvinyl chloride
  2 parts of acrylate
  0.5 parts of a lubricant
  7 parts of a foaming regulator
  0.5 part of a colorant The aforesaid auxiliary agents are conventional auxiliary agents in the art, so there is no need to go into details.

As shown in FIG. 2, the method for preparing the SPC foam flooring of this Example is as follows:
  a. The raw materials for the first stable layer (4) and the second stable layer (6) are fed into the high-speed mixer, mixed and heated, cooled in the low-speed mixer, and are extruded from the extruder A;
  b. The raw materials for the foaming layer (5) are fed into the high-speed mixer, mixed and heated, cooled under low-speed stirring, introduced into the extruder B, subjected to melt plastification and are extruded from the extruder B;
  c. The extrudate of the extruder A is allowed to enter the mold flow channel distributor and converge with the extrudate of the extruder B at the die head, and the mixture is co-extruded through the die orifice of the die head to form the stone-plastic base material structure;
  d. The plate released from the mold is passed through an area between the background pattern roller (10) and the first mirror finish roller (20) to form the background pattern by compression, the stone-plastic base material structure is transferred to an area between the second mirror finish roller (30) and the embossing roller (40); the wear-resistant layer and the decorative paper are transferred by the servo feeding roller for the wear-resistant layer (200) and the servo feeding roller for the decorative layer (300) to an area between the second mirror finish roller (30) and the air release roller (400), and are subjected to pre-lamination; the wear-resistant layer and the decorative paper are laminated on the base material layer through the action of the second mirror finish roller (30) and the embossing roller (40) to form the wear-resistant layer and the decorative layer, as well as a surface pattern with concave and convex three-dimensional effect on the front face.

The properties comparison between the most preferred embodiment and conventional stone-plastic flooring (without foaming) is shown in the Table below.

| | | Test results | |
| --- | --- | --- | --- |
| Test item | Test standard | Co-extrusion ABA stone-plastic flooring | ABA foam stone-plastic flooring (most preferred embodiment) |
| Dimensional change rate after heating | ISO 23999 | 0.13% | 0.08% |
| Curling after heating | ISO 23999 | 0.77 mm | 0.30 mm |
| Density | ISO 23996 | 1.984 g/cm³ | 1.531 g/cm³ |

EXAMPLES OF THE INVENTION

Embodiments of the Invention

As shown in FIG. 1, a co-extrusion SPC foam flooring comprises a decorative and protective structure and a stone-plastic base material structure.

The decorative and protective structure sequentially comprises, from top to bottom, a UV coating (1), a wear-resistant layer (2) and a decorative layer (3); the stone-plastic base material structure sequentially comprises, from top to bottom, a first stable layer (4), a foaming layer (5), and a second stable layer (6). The density of the SPC foam flooring is 1.465 g/cm³.

In this Example, the thickness of the UV coating (1) is 100 μm.

The wear-resistant layer (2) comprises a PVC resin as a main component and is obtained by the calendering process after the addition of suitable amounts of plasticizer, lubricant and stabilizer. Its thickness is 0.3 mm.

The decorative layer (3) is a PVC film with surface pattern. Its thickness is 0.07 mm.

The first stable layer (4) and the second stable layer (6) are both sheets with a PVC resin and filler powder as main components; wherein the amount of the PVC resin is 100 parts by weight, the filler powder is calcium carbonate with an amount of 250 parts by weight, and additives comprising the following components in parts by weight are added:
  5 parts of a calcium zinc stabilizer
  part of an internal lubricant
  1.4 parts of polyethylene wax
  5 parts of chlorinated polyethylene
  2 parts of acrylate
  parts of a composite lubricant
  0.5 parts of a colorant The aforesaid auxiliary agents are conventional auxiliary agents in the art, so there is no need to go into details.

The foaming layer (5) is a physical foaming layer comprising the following components in parts by weight:
  100 parts of polyvinyl chloride resin powder
  330 parts of calcium carbonate 5.5 parts of a calcium zinc stabilizer
part of an internal lubricant
1 parts of polyethylene wax
5.5 parts of chlorinated polyethylene
3 parts of acrylate
parts of a composite lubricant The aforesaid auxiliary agents are conventional auxiliary agents in the art, so there is no need to go into details.

As shown in FIG. 3, the method for preparing the SPC foam flooring of this Example is as follows:

a. The raw materials for the first stable layer (4) and the second stable layer (6) are fed into the high-speed mixer, mixed and heated, cooled under low-speed stirring, and are extruded from the extruder A;

b. The raw materials for the foaming layer (5) are fed into the high-speed mixer, introduced into the extruder B, mixed and heated, cooled under low-speed stirring, subjected to even melt plastification in the extruder B; 6 wt % liquefied high-pressure carbon dioxide is injected into the foaming agent injection device, a high pressure is maintained in the mold cavity to keep carbon dioxide in a liquid state so as to completely mix with the material, and the pressure is released during the course of extrusion;

c. The extrudate of the extruder A is allowed to enter the mold flow channel distributor and converge with the extrudate of the extruder B at the die head, and the mixture is co-extruded through the die orifice of the die head to form the stone-plastic base material structure;

d. The plate released from the mold is passed through an area between the background pattern roller (10) and the first mirror finish roller (20) to form the background pattern by compression, the stone-plastic base material structure is transferred to an area between the second mirror finish roller (30) and the embossing roller (40); the wear-resistant layer and the decorative paper are transferred by the servo feeding roller for the wear-resistant layer (200) and the servo feeding roller for the decorative layer (300) respectively to an area between the second mirror finish roller (30) and the air release roller (400), and are subjected to pre-lamination; the wear-resistant layer and the decorative paper are laminated on the base material layer through the action of the second mirror finish roller (30) and the embossing roller (40) to form the wear-resistant layer and the decorative layer, as well as a surface pattern with concave and convex three-dimensional effect on the front face.

The invention claimed is:

1. A co-extrusion foam flooring, comprising a stone-plastic base material structure,
wherein the stone-plastic base material structure sequentially comprises, from top to bottom, a first stable layer, a foaming layer and a second stable layer;
the first stable layer and the second stable layer are both sheets with a PVC resin and filler powder as main components;
wherein an amount of the PVC resin is 100 parts by weight and the amount of the filler powder is 200 to 300 parts by weight; and
wherein the foaming layer is a physical foaming layer comprising carbon dioxide as a physical foaming agent and the following components in parts by weight: 100 parts of polyvinyl chloride resin powder, 300 to 330 parts of calcium carbonate, 4 to 7 parts of a calcium zinc stabilizer, 1 to 1.5 parts of an internal lubricant, 1 to 1.5 parts of polyethylene wax, 4 to 8 parts of chlorinated polyethylene, 3 to 5 parts of acrylate, and 0.7 to 1.2 parts of a composite lubricant;
wherein a density of the foam flooring is in a range of 1.4 to 1.6 $g/cm^3$;
wherein the filler powder is calcium carbonate or comprises calcium carbonate as a main component and one material selected from the group consisting of calcium bicarbonate, glass fiber and carbon fiber or any mixture thereof.

2. The co-extrusion foam flooring of claim 1, wherein a thickness of the first stable layer is in a range of 1 to 5 mm; a thickness of the foaming layer is in a range of 2 to 10 mm; and a thickness of the second stable layer is in a range of 1 to 5 mm.

3. The co-extrusion foam flooring of claim 1, wherein the first stable layer and the second stable layer further comprise an additive, and the additive is one additive selected from the group consisting of a calcium zinc stabilizer, an internal lubricant, polyethylene wax, chlorinated polyethylene, acrylate, a composite lubricant, a colorant, and a combination thereof.

4. The co-extrusion foam flooring of claim 1, wherein the foaming layer comprises 0.3 to 0.5 parts of a colorant.

5. The co-extrusion foam flooring of claim 1, wherein the foaming layer comprises 0.4 to 0.6 parts of a colorant.

6. The co-extrusion foam flooring of claim 1, wherein the foam flooring further comprises a decorative and protective structure sequentially comprising, from top to bottom, a UV coating, a wear-resistant layer and a decorative layer.

7. A method for preparing a co-extrusion foam flooring, wherein the co-extrusion foam flooring comprises a stone-plastic base material structure sequentially including, from top to bottom, a first stable layer, a foaming layer and a second stable layer;

the method comprising the following steps:

a. feeding raw materials for the first stable layer and the second stable layer into a high-speed mixer, mixing and heating the raw materials, cooling a mixture of the raw materials in the low-speed mixer, extruding the mixture from a first extruder;

b. feeding raw materials for the foaming layer into the high-speed mixer, mixing and heating the raw materials, cooling the raw materials in the low-speed mixer, introducing the raw materials into a second extruder; performing even melt plastification and extruding the raw materials from the second extruder; performing even melt plastification for the raw materials in the second extruder, injecting 4-10 wt % liquefied high-pressure carbon dioxide into the foaming agent injection device, maintaining a high pressure in a mold cavity to keep carbon dioxide in a liquid state so as to completely mix with the material, releasing the pressure during a course of extrusion;

c. allowing the extrudate of the first extruder to enter a mold flow channel distributor and converge with the extrudate of the second extruder at a die head, co-extruding the mixture through a die orifice of a die head to form the stone-plastic base material structure;

d. passing a plate released from the mold through an area between a background pattern roller and a first mirror finish roller to form a background pattern by compression, transferring the stone-plastic base material structure to an area between a second mirror finish roller and an embossing roller; allowing a servo feeding roller for the wear-resistant layer and the servo feeding roller for a decorative layer to transfer a wear-resistant layer and a decorative paper respectively to an area between the second mirror finish roller and an air release roller, performing pre-lamination; laminating the wear-resistant layer and the decorative paper on a base material layer through an action of the second mirror finish roller and the embossing roller to form the wear-resistant layer and the decorative layer having, as well as a surface pattern with concave and convex three-dimensional effect on a front face;

e. providing a UV coating on the wear-resistant layer;

wherein the foam flooring further comprises a decorative and protective structure sequentially comprising, from top to bottom, a UV coating, a wear-resistant layer and a decorative layer;

the first stable layer and the second stable layer are both sheets with a PVC resin and filler powder as main components;

wherein an amount of the PVC resin is 100 parts by weight and the amount of the filler powder is 200 to 300 parts by weight;

wherein the foaming layer is a physical foaming layer comprising carbon dioxide as a physical foaming agent and the following components in parts by weight: 100 parts of polyvinyl chloride resin powder, 300 to 330 parts of calcium carbonate, 4 to 7 parts of a calcium zinc stabilizer, 1 to 1.5 parts of an internal lubricant, 1 to 1.5 parts of polyethylene wax, 4 to 8 parts of chlorinated polyethylene, 3 to 5 parts of acrylate, and 0.7 to 1.2 parts of a composite lubricant;

wherein a density of the foam flooring is in a range of 1.4 to 1.6 $g/cm^3$; and wherein the filler powder is calcium carbonate or comprises calcium carbonate as a main component and one material selected from the group consisting of calcium bicarbonate, glass fiber and carbon fiber or any mixture thereof.

\* \* \* \* \*